(12) United States Patent
Langhammer

(10) Patent No.: US 10,110,233 B2
(45) Date of Patent: Oct. 23, 2018

(54) METHODS FOR SPECIFYING PROCESSOR ARCHITECTURES FOR PROGRAMMABLE INTEGRATED CIRCUITS

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 75 days.

(21) Appl. No.: 15/190,716

(22) Filed: Jun. 23, 2016

(65) Prior Publication Data

US 2017/0371836 A1    Dec. 28, 2017

(51) Int. Cl.
*G06F 17/50* (2006.01)
*H03K 19/177* (2006.01)
*G06F 15/82* (2006.01)

(52) U.S. Cl.
CPC ... *H03K 19/17704* (2013.01); *G06F 17/5054* (2013.01); *G06F 15/82* (2013.01)

(58) Field of Classification Search
CPC .............................. G06F 17/5054; G06F 15/82
See application file for complete search history.

(56) References Cited

U.S. PATENT DOCUMENTS

| | | | |
|---|---|---|---|
| 3,473,160 A | 10/1969 | Wahlstrom | |
| 4,871,930 A | 10/1989 | Wong et al. | |
| 5,122,685 A | 6/1992 | Chan et al. | |
| 5,128,559 A | 7/1992 | Steele | |
| 5,371,422 A | 12/1994 | Patel et al. | |
| 5,483,178 A | 1/1996 | Costello et al. | |
| 5,581,696 A | 12/1996 | Kolawa et al. | |
| 5,689,195 A | 11/1997 | Cliff et al. | |
| 5,724,583 A | 3/1998 | Carmon et al. | |
| 5,754,459 A | 5/1998 | Telikepalli | |
| 5,825,202 A | 10/1998 | Tavana et al. | |

(Continued)

FOREIGN PATENT DOCUMENTS

| EP | 0 046 798 | 12/1991 |
|---|---|---|
| GB | 2 283 602 | 5/1995 |

(Continued)

OTHER PUBLICATIONS

Hennessy and Patterson, "Computer Architecture—A Quantitative Approach, 2nd Edition," 1996, pp. 75, 82.

(Continued)

*Primary Examiner* — Stacy Whitmore
(74) *Attorney, Agent, or Firm* — Treyz Law Group, P.C.; Tianyi He

(57) ABSTRACT

A programmable integrated circuit may include soft and hard logic for implementing a reduced instruction set computing (RISC) processor. Processor generator tools implemented on specialized computing equipment may be used to specify desired parameters for the processor architecture, including the data word size of one or more data paths, the instruction word size, and a set of instruction formats. The processor generator tools may also be used to determine the appropriate amount of pipelining that is required for each data path to satisfy performance criteria. The processor generator tools can also be used to analyze the processor architecture and to provide options for mitigating potential structural and data hazards.

20 Claims, 13 Drawing Sheets

(56) References Cited

U.S. PATENT DOCUMENTS

| | | | |
|---|---|---|---|
| 5,874,834 A | 2/1999 | New | |
| 6,069,487 A | 5/2000 | Lane et al. | |
| 6,211,697 B1 | 4/2001 | Lien et al. | |
| 6,215,326 B1 | 4/2001 | Jefferson et al. | |
| 6,407,576 B1 | 6/2002 | Ngai et al. | |
| 6,467,009 B1 | 10/2002 | Winegarden et al. | |
| 6,477,683 B1* | 11/2002 | Killian | G06F 17/5045 716/104 |
| 6,519,753 B1 | 2/2003 | Ang et al. | |
| 6,538,470 B1 | 3/2003 | Langhammer et al. | |
| 6,556,044 B2 | 4/2003 | Langhammer et al. | |
| 6,588,008 B1 | 7/2003 | Heddes et al. | |
| 6,628,140 B2 | 9/2003 | Langhammer et al. | |
| 6,760,888 B2* | 7/2004 | Killian | G06F 17/5045 712/1 |
| 7,020,854 B2* | 3/2006 | Killian | G06F 17/5045 712/1 |
| 7,237,234 B2* | 6/2007 | Granston | G06F 8/443 717/130 |
| 7,805,590 B2* | 9/2010 | Moyer | G06F 9/3001 711/141 |
| 7,823,091 B2* | 10/2010 | Dennison | G06F 17/505 716/102 |
| 7,886,255 B2* | 2/2011 | Simar, Jr. | G06F 17/5045 703/16 |
| 7,913,217 B1* | 3/2011 | Carreira | G06F 17/5054 703/14 |
| 8,006,204 B2* | 8/2011 | Killian | G06F 17/5045 700/1 |
| 8,438,521 B1* | 5/2013 | Jackson | G06F 17/5045 716/116 |
| 2003/0041235 A1* | 2/2003 | Meyer | G06F 17/5045 713/1 |
| 2003/0208723 A1* | 11/2003 | Killian | G06F 17/5045 716/102 |
| 2005/0257030 A1* | 11/2005 | Langhammer | G06F 15/7867 712/226 |
| 2006/0259878 A1* | 11/2006 | Killian | G06F 17/5045 716/102 |
| 2008/0244506 A1* | 10/2008 | Killian | G06F 17/5045 717/100 |
| 2008/0294411 A1* | 11/2008 | Gao | G06F 17/5022 703/15 |
| 2011/0307688 A1* | 12/2011 | Nurvitadhi | G06F 17/5045 712/219 |
| 2011/0320848 A1* | 12/2011 | Perry | G06F 17/505 713/340 |
| 2012/0065956 A1* | 3/2012 | Irturk | G06F 17/5045 703/21 |
| 2014/0233582 A1* | 8/2014 | Boden | H04L 45/121 370/410 |

FOREIGN PATENT DOCUMENTS

| | | |
|---|---|---|
| WO | 96 34346 | 10/1996 |
| WO | 2000/31652 | 6/2000 |
| WO | 03/091914 A1 | 11/2003 |

OTHER PUBLICATIONS

Microsoft Corporation, "Microsoft Computer Dictionary, 4th Edition," 1999, p. 139, 290.

* cited by examiner

METHODS FOR SPECIFYING PROCESSOR ARCHITECTURES FOR PROGRAMMABLE INTEGRATED CIRCUITS

BACKGROUND

Integrated circuits such as programmable logic device integrated circuits (sometimes referred to herein as "PLDs") include circuitry that is dedicated to performing specific tasks. This dedicated circuitry is often referred to as "microprocessors" or "embedded processor components."

A PLD may also include many regions of programmable logic that are interconnected in a variety of different ways by programmable interconnection resources. Each logic region is configured to perform any of several logic functions on input signals applied to that region from the interconnection resources. As a result of the logic function it implements, each logic region produces one or more output signals that can be fed to any other logic region via the programmable interconnect resources.

As described above, a PLD may include both programmable logic regions and dedicated (i.e., at least partly hard-wired) microprocessor circuitry. Such dedicated microprocessor circuitry can perform at least some of the tasks that are typically associated with microprocessors more rapidly than those performed by general-purpose, programmable logic provided elsewhere on the PLD.

Although having a dedicated, full-featured microprocessor on a PLD may be advantageous in some situations, there are also many situations in which only certain features or functions of a dedicated microprocessor need to be performed at the greater speeds typically achievable with dedicated, hard-wired circuitry. In these cases, much of the full-featured microprocessor circuitry may be essentially unused and therefore wasted. On the other hand, a general-purpose programmable processor may not be the most efficient circuit for performing certain tasks such as digital signal processing (DSP) or very long instruction word (VLIW) processing, where it is frequently desired to perform multiple operations in parallel.

It is within this context that the embodiments described herein arise.

SUMMARY

Methods of using processor generator tools implemented on specialized computing equipment to generate a processor (e.g., a reduced instruction set computing or RISC processor) on a programmable integrated circuit is provided. The method may include presenting a user with an opportunity to specify desired processor parameters, receiving the processor parameters from the user, analyzing the received processor parameters to determine whether a viable processor can be generated, and generating the processor for the programmable integrated circuit based on the received processor parameters. If the received processor parameters are not viable, alternative processor parameters may be suggested.

Processor parameters that may be specified may include: a data word size for a given data path in the processor, different data word sizes for multiple data paths in the processor, an instruction word size for the processor, a number of registers for the processor, a number of interrupts that is supported by the processor, and a set of instructions (e.g., instruction formats) for the processor. Based on the set of received instructions formats, the processor generator tools may determine which functional units are required on the programmable integrated circuit and which of the functional units are implemented using soft logic and hard logic on the programmable integrated circuit.

The processor generator tools may also be used to provide suggested pipeline settings for each processor component in the processor and to insert additional pipeline stages into the processor based on the suggested pipeline settings. The user may choose from among the suggested pipeline settings and the tools may verify that the pipeline setting chosen by the user passes legality check. Generally, more pipeline stages may be inserted into components implemented in soft logic than components implemented in hard logic.

The processor generator tools can also be used to analyzing each data path in the processor to determine whether a hazard is present (e.g., a structural hazard or a data hazard). If a potential hazard is detected, the tools may provide an option to resolve the hazard. Options to resolve a structural hazard may include at least: an option to add ports to a register file in the processor, an option to specify a priority resolution scheme for conflicting operations, an option to partition a destination register in the processor, an option to temporarily stall the processor; an option to temporarily store values in a shadow register; and an option to increase the number of identical multicycle operations in the processor. On the other hand, options to resolve a data hazard may include at least: an option to manage the data hazard in software, an option to implement hardware interlocking to stall the top of a processor pipeline, and an option to specify a level of forwarding for each data path in the plurality of data paths.

Further features of the invention, its nature and various advantages will be more apparent from the accompanying drawings and following detailed description.

DETAILED DESCRIPTION

Embodiments of the present invention relate to programmable integrated circuits and, more particularly, to methodologies for using a processor generator tool to specify a base processor architecture, to select desired pipelining settings, and to analyze for potential structural and data hazards.

As an example, the processor generator tool may be used to generate a reduced instruction set computing (RISC) processor architecture on a programmable integrated circuit device. This is, however, merely illustrative. If desired, the embodiments herein may be applied to microprocessor without interlocked pipeline stages (MIPS) architecture, complex instruction set computing (CISC) architectures, or other types of microprocessor architectures.

For example, a user may be able to select a number of parameters for the base processor architecture, including but not limited to the data word size, the proposed instruction word size, the size of the program and data spaces, the number of interrupts allowed, the number of registers, the set of instruction formats, etc. The tool may also be used to estimate the level of pipelining needed to satisfy performance criteria and to help detect and resolve common processor hazards such as structural hazards and data hazards.

It will be obvious to one skilled in the art, that the present exemplary embodiments may be practiced without some or all of these specific details. In other instances, well-known operations have not been described in detail in order not to unnecessarily obscure the present embodiments.

Figure 1:
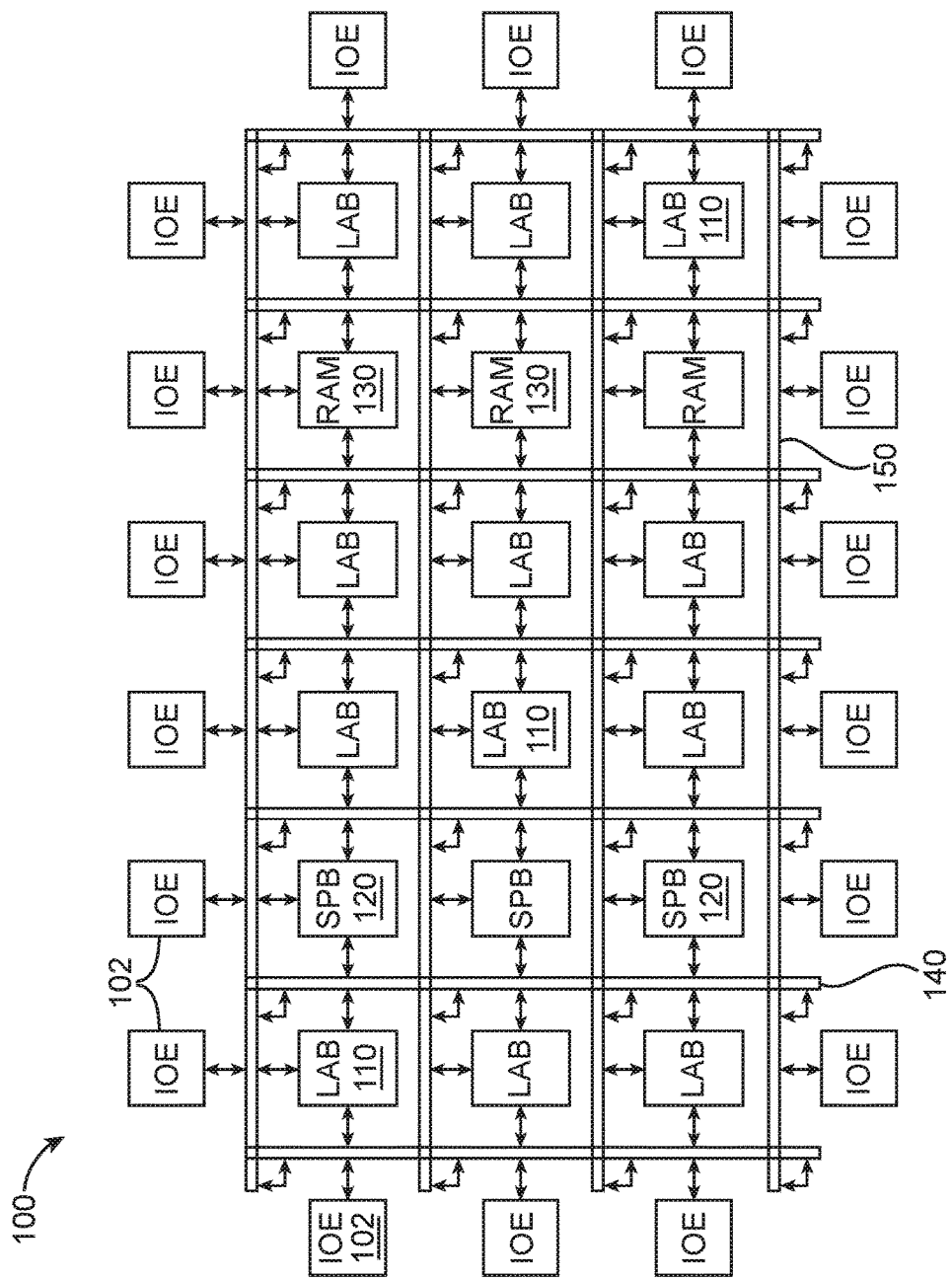
FIG. 1 is a diagram of an illustrative programmable integrated circuit in accordance with an embodiment.

An illustrative embodiment of an integrated circuit such as programmable logic device (PLD) 100 that can be used to implement microprocessor architectures is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and configurable specialized processing blocks such as specialized processing blocks (SPB) 120, for example. Memory blocks 130 are sometimes referred to as embedded memory blocks. Specialized processing blocks 120 may include digital signal processing (DSP) blocks, which can be used to perform fixed point arithmetic functions and/or floating point arithmetic functions. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain memory elements. Memory elements such as RAM blocks 130 may be loaded with data using input-output elements (IOEs) 102. On the other hand, memory elements loaded with configuration data are sometimes referred to as configuration random-access memory (CRAM). No configuration data is loaded into the CRAMs using dedicated configuration ports. Once loaded, the configuration memory elements each provide a corresponding static control signal that controls the operation of an associated functional block (e.g., LABs 110, SPB 120, RAM 130, or input-output elements 102). The programmable components on device 100 (e.g., programmable elements such as lookup table circuits, multiplexing circuits, pipeline elements, logic gates, registers, drivers, and other configurable elements) may be referred to generally as "soft" logic. In contrast, other processing components at least a portion of which is hard-wired may be referred to as "hard" logic. The use of the term "embedded" block is sometimes used synonymously with hard logic.

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), configuration memory elements, or programmable memory elements.

In addition, the programmable logic device may have input-output elements (IOEs) 102 for driving signals off of PLD and for receiving signals from other devices. Input-output elements 102 may include parallel input-output circuitry, serial data transceiver circuitry, differential receiver and transmitter circuitry, or other circuitry used to connect one integrated circuit to another integrated circuit. As shown, input-output elements 102 may be located around the periphery of the chip. If desired, the programmable logic device may have input-output elements 102 arranged in different ways. For example, input-output elements 102 may form one or more columns of input-output elements that may be located anywhere on the programmable logic device (e.g., distributed evenly across the width of the PLD). If desired, input-output elements 102 may form one or more rows of input-output elements (e.g., distributed across the height of the PLD). Alternatively, input-output elements 102 may form islands of input-output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments of the present invention may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
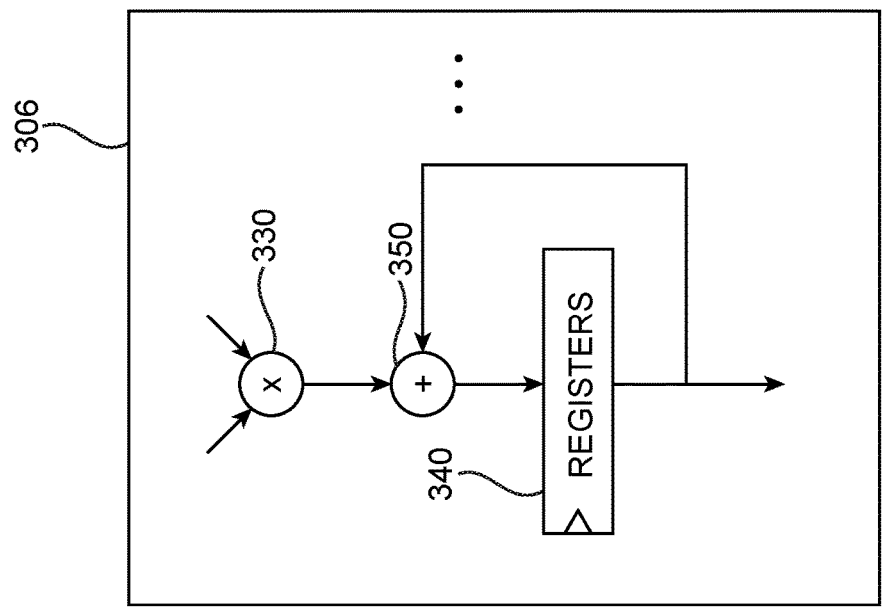
FIG. 2 is diagram of an illustrative embedded arithmetic logic unit (ALU) in accordance with an embodiment.

FIG. 2 shows an illustrative embedded arithmetic logic unit (ALU) such as embedded ALU 306. Embedded ALU 306 may be implemented using specialized processing block 120 of FIG. 1. As shown in FIG. 2, ALU 306 (sometimes referred to as an embedded digital signal processor block or "DSP block") may include one or more instances of a dedicated (i.e., at least partially hard-wired) parallel multiplier 330, registers 340, and dedicated parallel adder 350 for adding each successive product word output by multiplier 330 to the current contents of registers 340 to produce a new accumulated value for storage in register 340. Configured in this way, ALU 306 may be referred to as a multiplier-accumulator (MAC) block.

Figure 3:
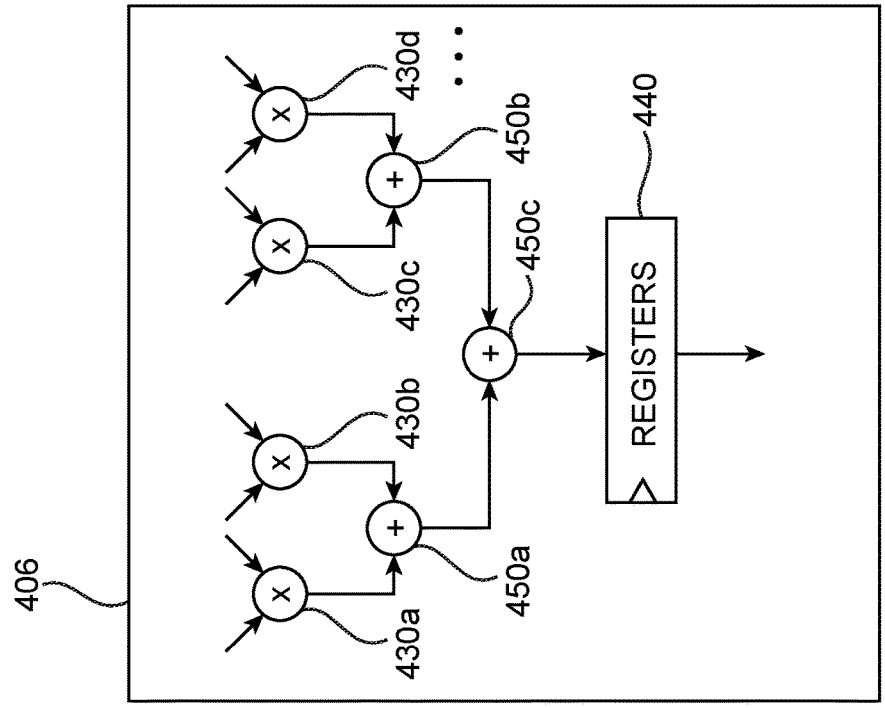
FIG. 3 is a diagram of an illustrative embedded arithmetic logic unit adapted to perform complex dot product operations in accordance with an embodiment.

FIG. 3 shows another type of embedded ALU such as ALU 406 that can also be implemented on programmable integrated circuit device 100 (FIG. 1). As shown in FIG. 3, ALU 406 may include several dedicated parallel multipliers 430*a-d* (each of which may be similar to previously described multiplier 330), dedicated parallel adders 450*a-c* (each of which may be similar to previously described adder 350) for collectively adding together the product words output by multipliers 450, and registers 440 (which may be similar to previously described registers 340) for latching the parallel outputs of the final adder 450*c*. The ALU of FIG. 3 may be suitable for performing dot products for vector operations and for implementing finite impulse response (FIR) digital filtering (as examples).

Figure 4:
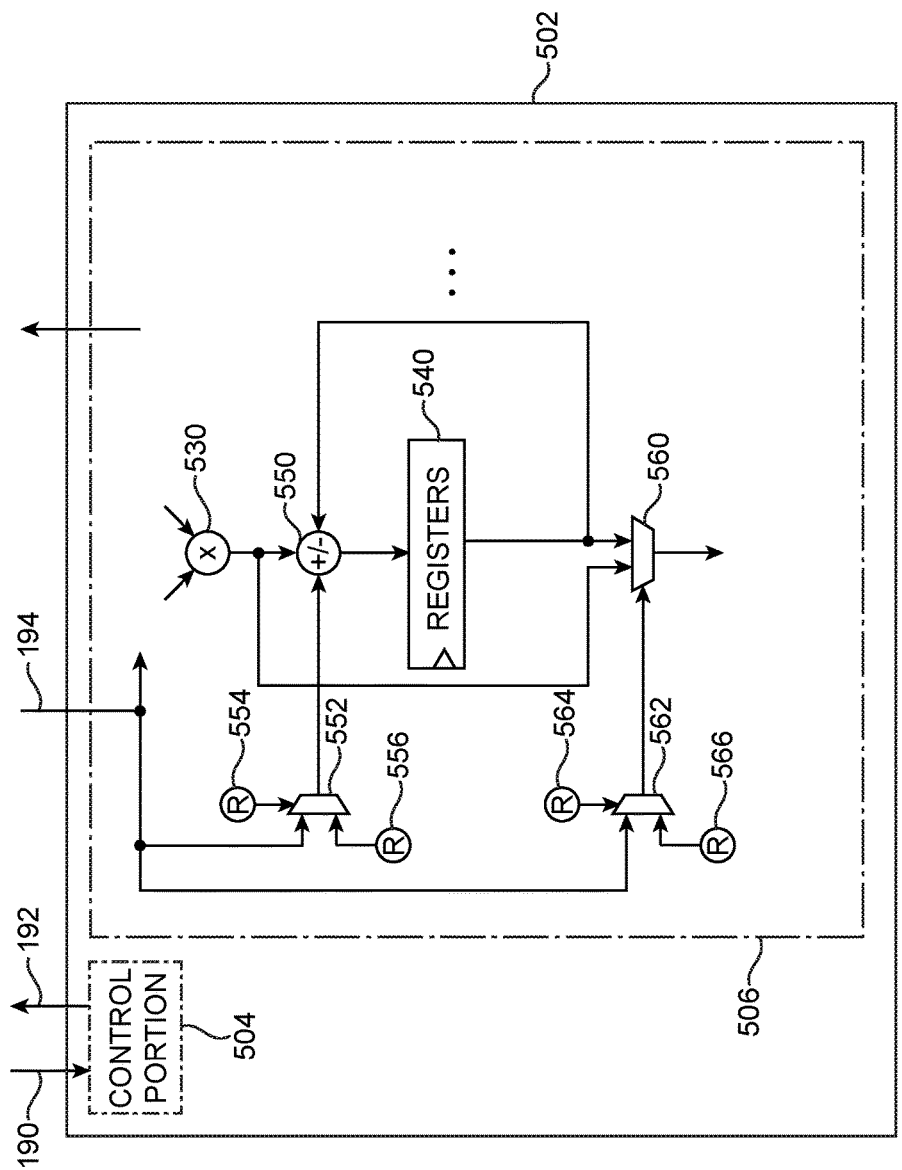
FIG. 4 is a diagram of an illustrative embedded arithmetic logic unit that can be dynamically configured based on a current instruction to perform several different digital signal processing (DSP) operations in accordance with an embodiment.

FIG. 4 is a diagram of yet another illustrative embedded ALU such as ALU 502 that can be dynamically configured based on a current instruction to perform several different digital signal processing (DSP) operations in accordance with an embodiment. As shown in FIG. 4, unit 502 may include control portion 504 and processing portion 506 (at least conceptually similar to ALUs 306 and 406 in FIGS. 2 and 3, respectively). Control portion 504 may include an address generator and a program sequential (not shown in FIG. 4 to not unnecessarily obscure the present embodiments) and may communicate with the programmable logion regions on device 100 via paths 190 and 192.

FIG. 4 shows some examples of how signals 194 from programmable soft-logic regions may control various aspects of ALU portion 506. Operating portion 506 may include one or more instances of elements 530, 540, 550, 552, 554, 556, 560, 562, 564, and 566. Element 530 is dedicated parallel multiplier. Element 550 is a dedicated parallel adder/subtractor circuitry. The output of multiplexer 552 controls whether adder/subtractor 550 adds or subtracts its other inputs. Registers 540 may be used to latch signals generated at the output of adder/subtractor 550. Element 552 may be a multiplexer that is controlled by memory element 554 to select as its output either one of its two other inputs. The two other inputs to multiplexer 552 are one of signals 194 (in this case a control signal) and the output of another memory element 556. Thus, memory element 554 can be programmed to control multiplexer 552 to get is output from either the soft-logic portion or from memory element 556.

Element 560 is a multiplexer (e.g., a bank of parallel multiplexers) for outputting either the parallel outputs of multiplier 530 or the parallel outputs of registers 540, depending on the state of the control signal output by multiplexer 562. Multiplexer 562 may be similar to multiplexer 552. Multiplexer 562 may be controlled by memory element 564 to output either the signal on one of leads 194 or the output signal of memory element 566. Configured in this way, the use of multiplexing circuits 552 and 562 allows ALU 502 to exhibit enhanced configurability at run time.

Figure 5:
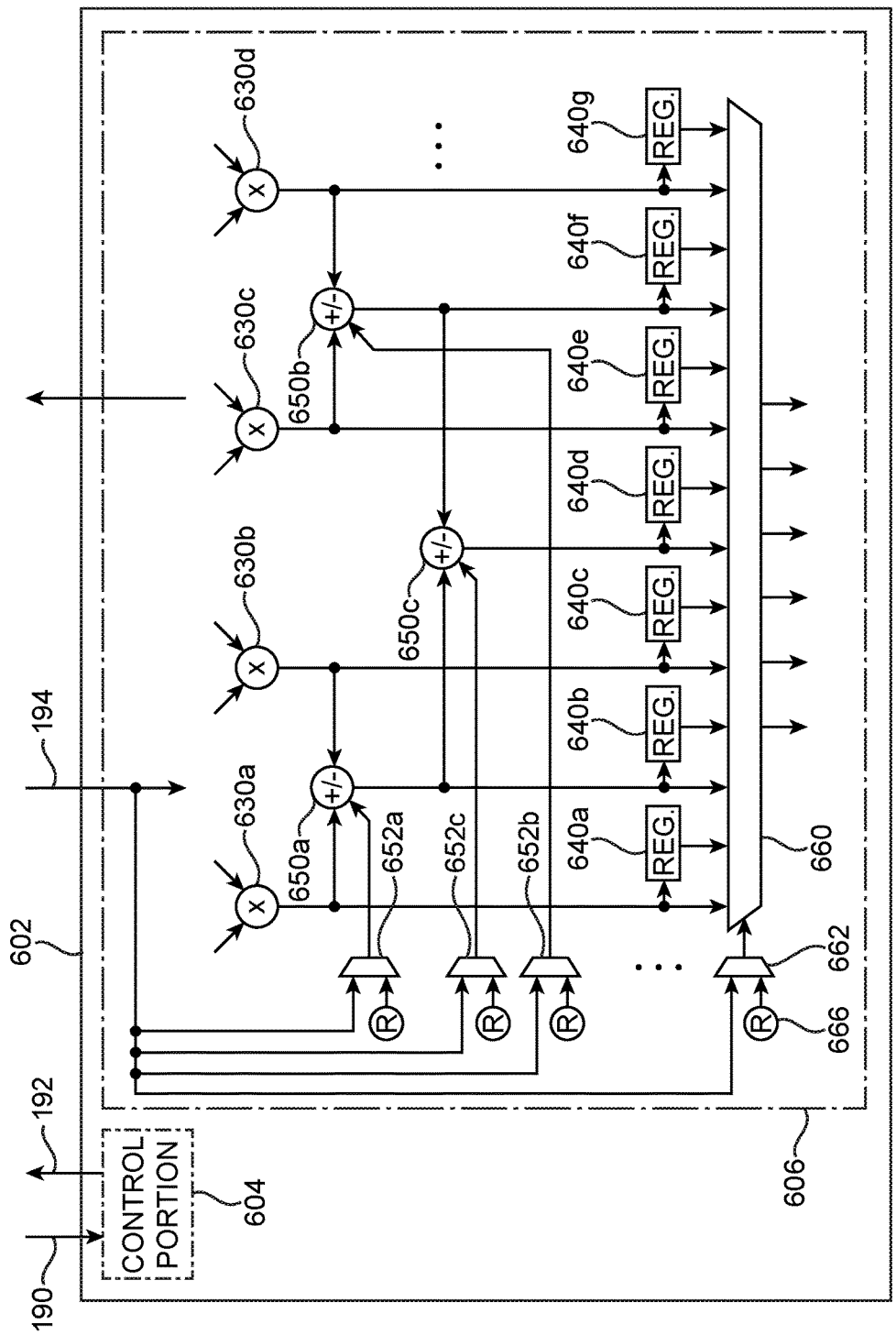
FIG. 5 is a diagram showing a dynamically configurable version of the ALU shown in FIG. 3 in accordance with an embodiment.

In accordance with another suitable arrangement, FIG. 5 showing a dynamically configurable version of ALU 406 shown in FIG. 3. Embedded ALU 602 of FIG. 5, to a large extent, combines features and/or concepts that have already been discussed. Elements that are the same as or similar to previously discussed elements have either the same reference numbers in FIG. 5 or reference numbers that are increased by 100, 200, and/or 300 from reference numbers previously used for the same or similar elements. The discussion of FIG. 5 can therefore be abbreviated and confined to just the significant differences from what has been previously explained.

FIG. 5 shows an operating portion 606 in which more of the adders 650 can alternatively function as subtractors. FIG. 5 also shows an operating portion in which the multiplier/adder tree can be partitioned in any of many different ways, and in which the outputs of any of the various partitions can be output in registered and/or unregistered form.

For example, the output of multiplier 630*a* need not be combined with anything else, and that output can be either unregistered or registered by registers 640*a* (or both the registered and unregistered signals may be output). Multiplexer 660 may select the final outputs of operating portion 606 from among the many registered and unregistered signals applied to that multiplexer. As another example, adder/subtractor 650*a* may be used to combine the outputs of multipliers 630*a* and 630*b*, and that adder/subtractor output may be output (uncombined with any other signal, but either registered, unregistered, or both) using multiplexer 660. As yet another example, all of adders/subtractors 650 may be used to combine the outputs of all four multipliers 630, and that all-adder/subtractor output may be output by multiplexer 660 either registered, unregistered, or both. Other examples may include outputting some multiplier 630 outputs uncombined, while also outputting combined multiplier outputs.

The control of adder/subtractors 650 can be either dynamic (based on inputs 194 from the soft-logic portion) or static (based on the programmed state of the memory elements that supplied alternative inputs to multiplexer 652*a-c*. Also as in FIG. 4, the control of multiplexer 660 can be either dynamic (based on inputs 194 from the soft logic portion) or more static (based on the programmed state of memory element(s) 666 that supply alternative input(s) to multiplexer 662).

Still more capability and flexibility may be given to operating portions like 606 in FIG. 5. For example, feedback loops from the outputs of registers 640 to the adder/subtractors 650 or other adders, subtractors, or adder/subtractors may be provided to allow one or more accumulator functions to be performed, if desired. Use of these feedback loops and accumulator functions may be controlled in generally the same way that the various options actually shown in FIG. 5 can be selected (e.g., either by relatively static program control, by dynamic control from the soft-logic portion, or by programmable selection of either of these types of control).

The embedded ALUs of the type described above in connection with FIGS. 2-5 may be implemented using hard logic, but may nevertheless exhibit flexibility to support various configurations (e.g., via the use of multiplexing circuits 552, 560, 562, 652, 660, and 662). These embedded arithmetic units merely represent one type of functional unit that can be included in an overall processor architecture on a programmable device.

Figure 6A:
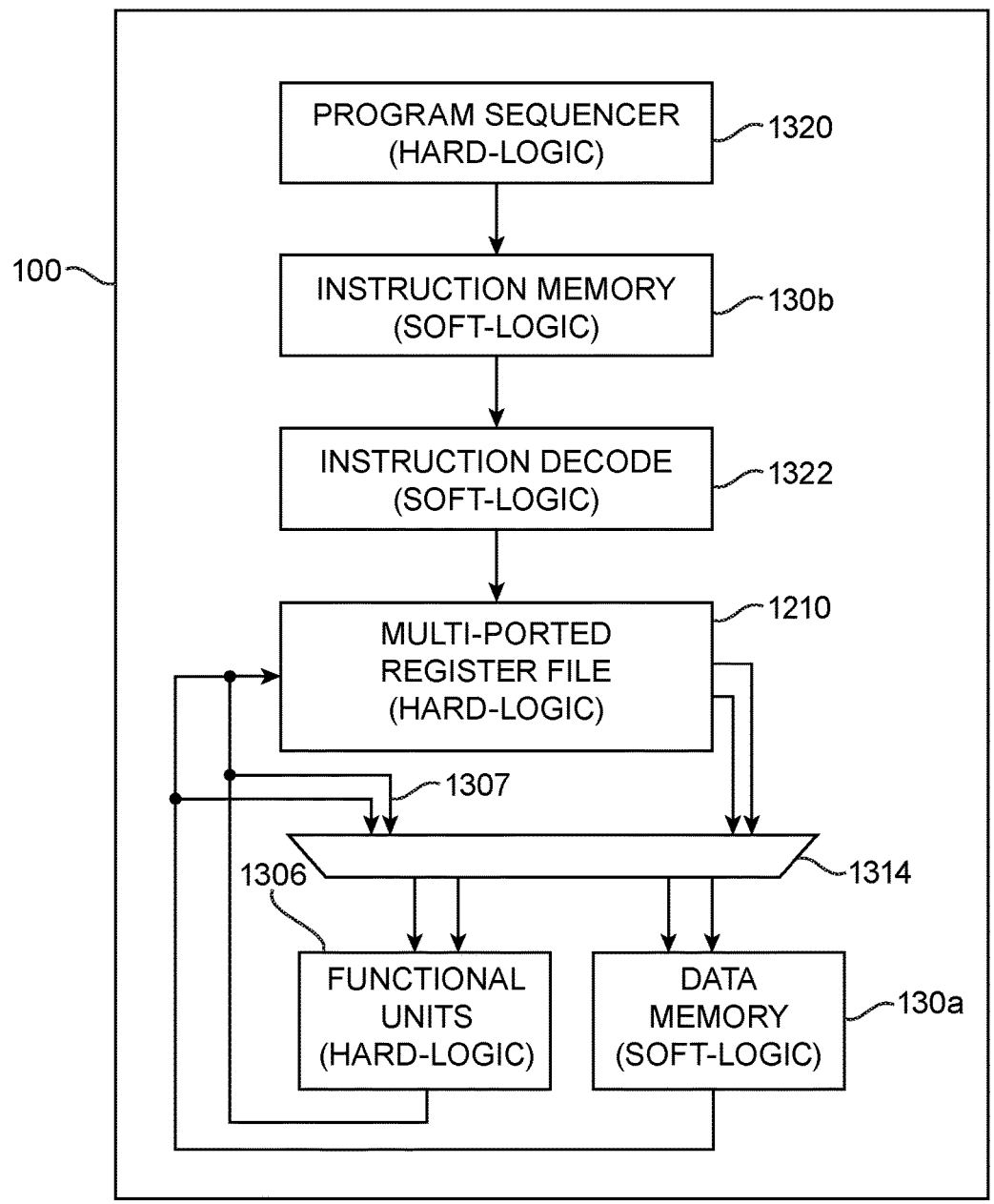
FIG. 6A shows one suitable implementation of a processor architecture in accordance with an embodiment.

FIG. 6A shows one suitable implementation of an exemplary processor architecture in accordance with an embodiment. As shown in FIG. 6A, the processor may have an instruction fetch stage that includes a program sequencer 1320 and instruction memory 130b, an instruction decode stage that includes instruction decode circuit 1322 and multi-ported register file 1210, an execution stage that includes functional units 1306, a memory access stage that includes data memory 130a, and a write back stage that includes routing wires for facilitating the writing back of values computed by functional units 1306 to register file 1210. Data memory 130a and/or instruction memory 130b may be implemented using random access memory blocks 130 of FIG. 1. Data memory 130a and instruction memory 130b are shown as being implemented using separate memory blocks in FIG. 6, but can alternatively be implemented using a shared memory block, if desired.

Program sequencer 1320 (sometimes referred to as a "program counter") may be used to select or generate the next instruction address, which may be a branch address, or the next address following the current address. Program sequencer 1320 may be an embedded processor component that is implemented using hard logic, or in the case of a simple sequencer, it could be efficiently implemented in soft logic. An example of a complex program counter that might be implemented as a hard embedded block might contain interrupt control circuitry and/or branch prediction circuitry. On the other hand, a simple sequencer that might be implemented in soft logic may contain a simple program counter that increments the current address by a predetermined word size (e.g., PC=PC+4) and/or that implements a branching operation supporting an absolute address. The instruction address output by program sequencer 1320 can then be used to retrieve the next instruction from instruction memory 130b.

As described above, instruction memory 130b may be implemented using existing embedded memory blocks 130 on device 100 (see, e.g., FIG. 1). As its name suggests, instruction memory 130b stores the program or the machine code, and the address provided by program sequencer 1320 serves as a pointer to instruction memory 130b. Each instruction that is stored on memory 130b may be referred to as "an instruction word" and may have an associated instruction word size. A parameter that is user-selectable is whether the instruction memories can be dynamically loaded (which may require more switching circuitry) or statically loaded (i.e., the instruction memory is implemented using read-only memory). Other options may include whether instruction memory 130b acts as a cache in a memory hierarchy and the type of cache access.

Instruction decoder 1322 may generally be implemented in soft logic since there can be many possible mappings of instruction words to control words or bits. For example, some embedded functional blocks would require an operation to be selected from an input word (i.e., the control word to the functional block would be further decoded into individual actions) while other functional blocks would require the operations to be individually selected from a set of input (possibly one-hot) bits. Part of the decoding process involves fetching the input operands. For example, an "add" instruction that adds the contents of register A and B may only require fetching the current values of registers A and B. As another example, an "addi" (add immediate) instruction may require fetching a register value and sign-extend an immediate value. Different instructions may therefore involve different operations to be processed.

Multi-ported register file 1210 may be an embedded/hard block. A register file is an array of processor registers with dedicated read and write ports for temporarily storing values computed during a processor instruction. For example, a "load" instruction may involve fetching data from data memory 130a and temporarily holding the fetched data in one of the registers. Data memory 130a (generally implemented using existing memory blocks 130 on device 100) may be used to store data manipulated by the program. On the other hand, a "store" instruction may involve writing data currently held on one of the registers to the data memory for later processing. For some simpler register files (depending on the number of registers, the width of the registers, and the number of ports required), register file 1210 may instead be implemented in soft logic.

Figure 7:
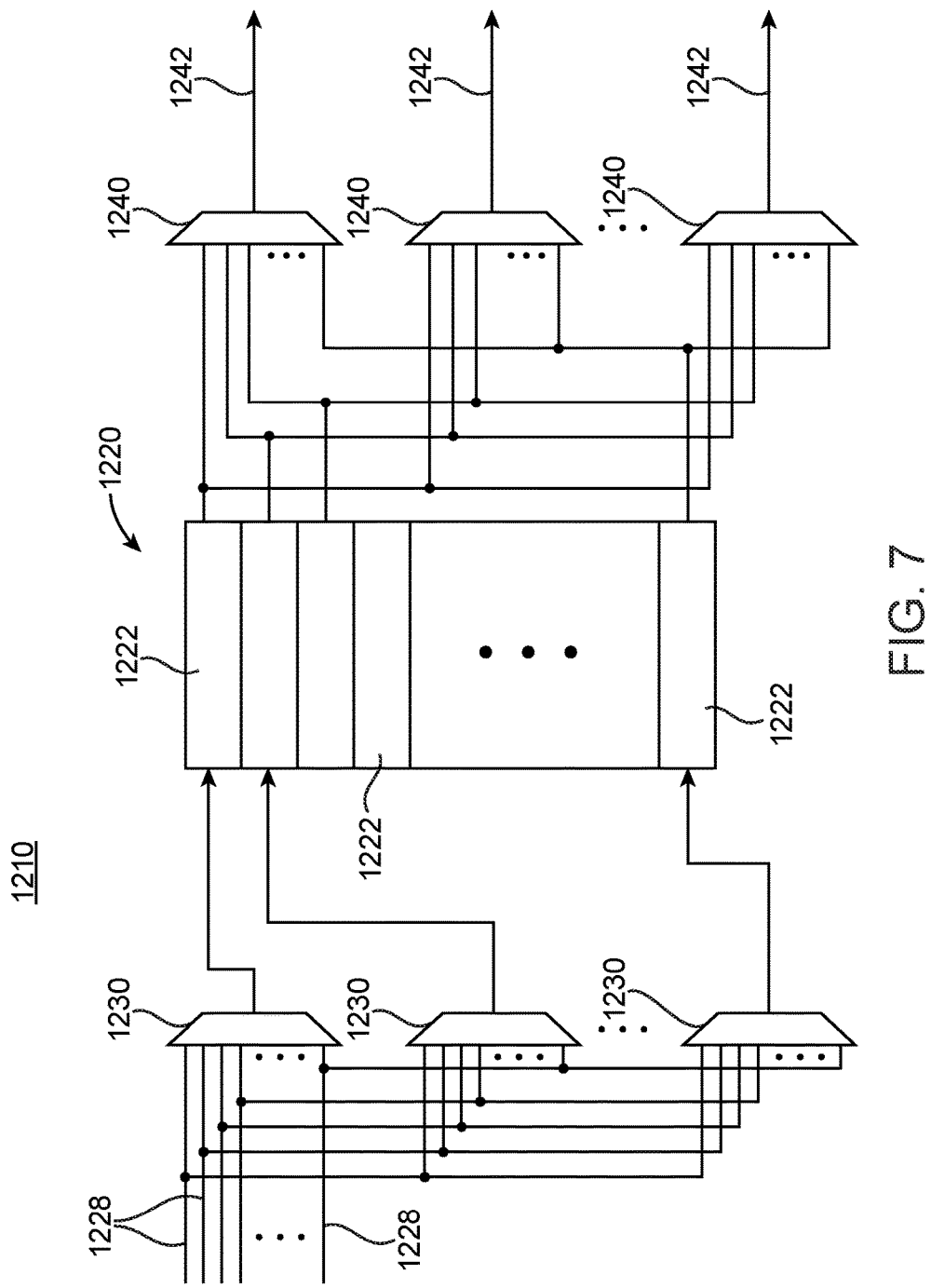
FIG. 7 is a diagram of multiport register file circuitry in accordance with an embodiment.

FIG. 7 is a diagram of multiport register file circuitry in accordance with an embodiment. As shown in FIG. 7, a multi-ported register file 1210 may include a memory 1220 including several (e.g., sixteen) registers 1222, each of which is capable of storing a multi-bit (e.g., a 16-bit data word). Each register 1222 has an associated input multiplexer 1230 and an associated output multiplexer 1240. Each input multiplexer 1230 is capable of applying any one of eight 16-bit input words to the associated register 1222 for storage in that register. The eight 16-bit inputs 1228 to register file 1210 are sometimes referred to as the input ports of the register file. Each output multiplexer 1240 is capable of applying the contents of any one of the 16 registers 1222 to an associated output port 1242 of the register file.

Each of multiplexers 1230 and 1240 may be either programmably controlled (e.g., by memory elements) to make a fixed selection or dynamically controlled (e.g., by time-varying logic or other control signals) to make a more dynamic selection. All of multiplexers 1230 and 1240 are operable in parallel so that as many as eight input words can be simultaneously routed into register file 1210 while as many as eight output words can be routed out of the register file at the same time.

It should be understood that the specific sizes mentioned above for various aspects of register file 1210 are only illustrative and that other sizes can be used instead if desired. For example, the register file can have more or less than the sixteen registers 1222 mentioned above, and the size of each register can be smaller or larger than the 16 bits mentioned above. Similarly, the register file can have more or less than eight input ports and eight output ports. A simple RISC processor may only have a single write port (as an example). The number of input and output ports in the register file can also be different.

Referring back to FIG. 6A, a multiplexing circuit such as multiplexer 1314 may be interposed between register file 1210 and data memory 130a. Multiplexer 1314 may be part of the soft logic fabric that serves to connect the processor components together. If desired, multiplexer 1314 may be used to support forwarding. Forwarding occurs when the result of an operation is needed before it is written back to the register file or data memory. As examples, another instruction may need the result as one of its operands (usually obtained from one of the registers) or a read operation may use the result as an index (again, from the register file). Forwarding may be supported using paths such as path 1307 in FIG. 6A to route signals output from functional units 1306 directly back to an input of multiplexer 314, thereby bypassing write back to register file 1210.

Functional units 1306 may be configured to serve as an arithmetic logic unit (e.g., with addition and multiplication functions), a logic block with combinational logic functions, a custom block for supporting fast Fourier transform (FFT) operations, an encryption block to support networking operations, etc. Functional units 1306 may generally be embedded blocks, such as DSP blocks. Depending on the complexity of the processor instructions, functional units 1306 may also be constructed from soft logic. In some cases, if the functional unit does not contain any multiplies and only bit-wise logic and addition/subtraction circuitry is required, the soft logic implementation could even be merged with multiplexer 1314.

Figure 6B:
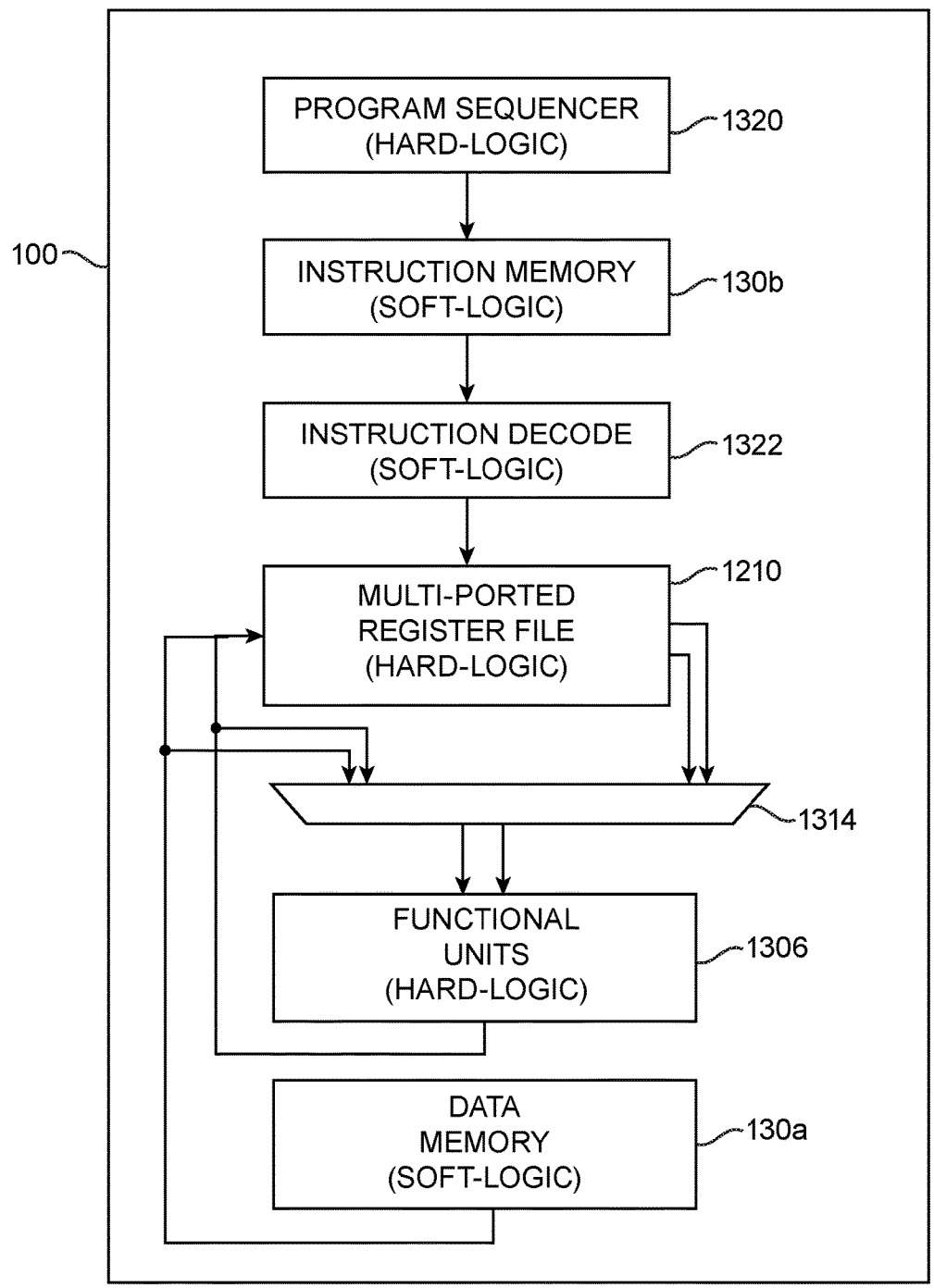
FIG. 6B shows another suitable implementation of a processor architecture in accordance with an embodiment.

The processor architecture shown in FIG. 6A may represent one suitable arrangement of a RISC processor architecture. FIG. 6B shows another suitable embodiment in which functional units 1306 are interposed between multiplexer 1314 and data memory 130a. Each block in the architectures of FIGS. 6A and 6B may be separate pipeline stages but does not have to be such as stage. If desired, additional pipeline stages may be inserted into any portion of the RISC architecture to help improve circuit performance.

Figure 8:
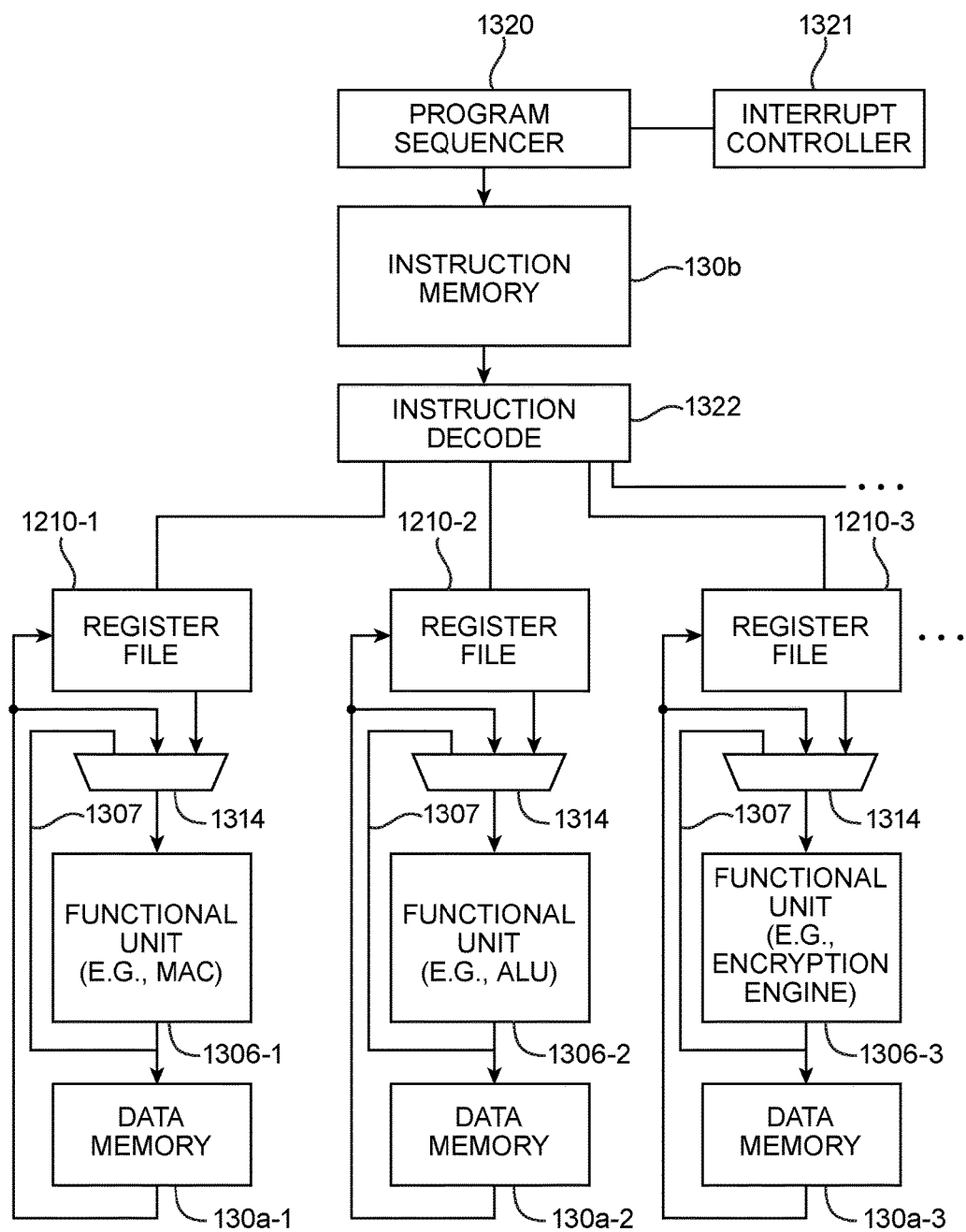
FIG. 8 is a diagram of an illustrative processor architecture that supports multiple data paths in accordance with an embodiment.

FIG. 8 is a diagram of an illustrative processor architecture that supports multiple data paths in accordance with an embodiment. Elements that are the same as or similar to previously discussed elements have either the same reference numbers in FIG. 6A or reference numbers organized into separate groups. The discussion of FIG. 8 can therefore be abbreviated and confined to just the significant differences from what has been previously explained. FIG. 8 shows an interrupt controller such as interrupt controller 1321 that can be coupled to program sequencer 1320 to handle interrupts in a sequence of complex instructions.

The example of FIG. 8 shows at least three separate data paths that can be supported by the RISC architecture of FIG. 6B. As shown in FIG. 8, the first data path may include a first register file set 1210-1, a first multiplexing circuit 1314, a first functional unit 1306-1, and a first data memory block 130a-1. Functional unit 1306-1 may, for example, implement a 16-bit multiply-accumulate (MAC) function. The second data path may include a second register file set 1210-2, a second multiplexing circuit 1314, a second functional unit 1306-2, and a second data memory block 130a-2. Functional unit 1306-2 may, for example, be an arithmetic logic unit that supports 32-bit floating point calculations. The third data path may include a third register file set 1210-3, a third multiplexing circuit 1314, a third functional unit 1306-3, and a third data memory block 130a-3. Functional unit 1306-3 may, for example, be a 128-bit encryption engine that supports complex cryptographic algorithms.

As illustrated in the example above, different data paths can have different data words sizes. Each of the different register sets can also be of different sizes. For example, a register set associated with smaller bit widths will tend to be smaller than another register set associated with larger bit widths. In accordance with some embodiments, data can also be moved between the different data paths. For example, data stored in a first register set in a first data path may be transferred to a second register set in a second data path. In cases where the first register set is larger than the second register set, the data may be transferred in multiple sub-words and stored into multiple locations in the smaller register set. In cases where the first register set is smaller than the second register set, multiple data words may be stored at a single address in the larger register set.

The different data memory blocks 130a can also be of different sizes. Although only one register file is shown in each data path, it is also possible to have multiple different register files per data path, if desired. The example of FIG. 8 in which the RISC processor architecture is used to support three parallel data paths is merely illustrative and does not serve to limit the scope of the present embodiments. If desired, the processor architecture described herein may be adapted to support less than two parallel data paths or more than three parallel data paths. In yet other suitable embodiments, programmable device 100 may also include multiple instances of the RISC processor shown in FIG. 8 to provide even more processing capability.

Figure 9:
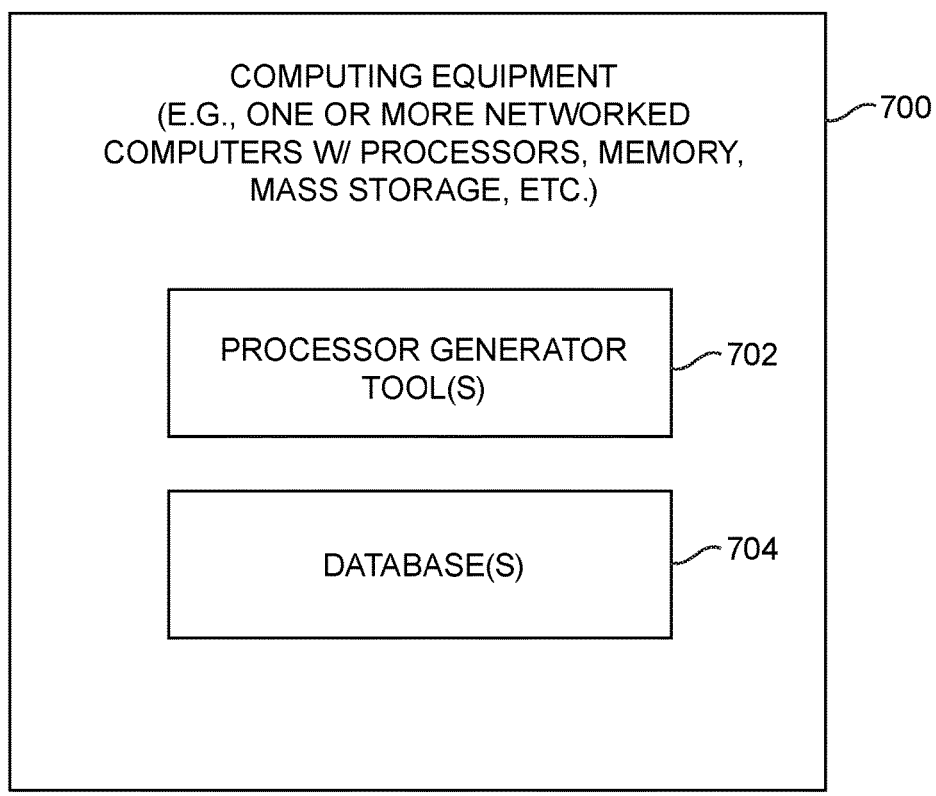
FIG. 9 is a diagram of processor generator tools that can be used to generate an optimal processor architecture for a programmable integrated circuit in accordance with an embodiment.

In accordance with an embodiment, the RISC processor architecture of the type described in connection with FIG. 8 may be generated using processor generator tools such as the processor generator tools of FIG. 9. Processor generator tool(s) 702 may be implemented on specialized computing equipment 700. For example, system 700 may be based on one or more processors such as personal computers, workstations, etc. The processors may be linked using a network (e.g., a local or wide area network). Memory in these computers or external memory and storage devices such as internal and/or external hard disks may be used to store instructions and data.

Software-based components such as processor generator tool(s) 702 and database(s) 704 may reside on system 700. During operation, executable software such as the software of processor generator tools 702 runs on the processor(s) of system 700. Databases 704 are used to store data for the operation of system 700. In general, software and data may be stored on any computer-readable medium (storage) in system 700. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s). When the software of system 700 is installed, the storage of system 700 has instructions and data that cause the computing equipment in system 700 to execute various processes. When performing these processes, the computing equipment is configured to implement the functions of the processor generator tools.

Processor generator tools 702 may be provided by a single vendor or by multiple vendors. Tools 702 may be provided as one or more suites of tools (e.g., a compiler suite for performing tasks associated with implementing a processor design in a programmable logic device) and/or as one or more separate software components (tools). Database(s) 704 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool.

Tools may also pass information between each other without storing information in a shared database if desired.

In accordance with a first method, processor generator tools 702 may be used to specify and generate a single-issue (i.e., one instruction executed per clock cycle) RISC processor. A user or designer may input a number of desired processor parameters. The parameter entry may be input via a graphical user interface (e.g., a GUI that allows the user to input numbers into selected fields or to select from a list of supported features from a pull-down menu, etc.), via a text file (e.g., a text file in XML format that lists the desired processor specifications and constraints), or other suitable methods of entering data.

Figure 10:
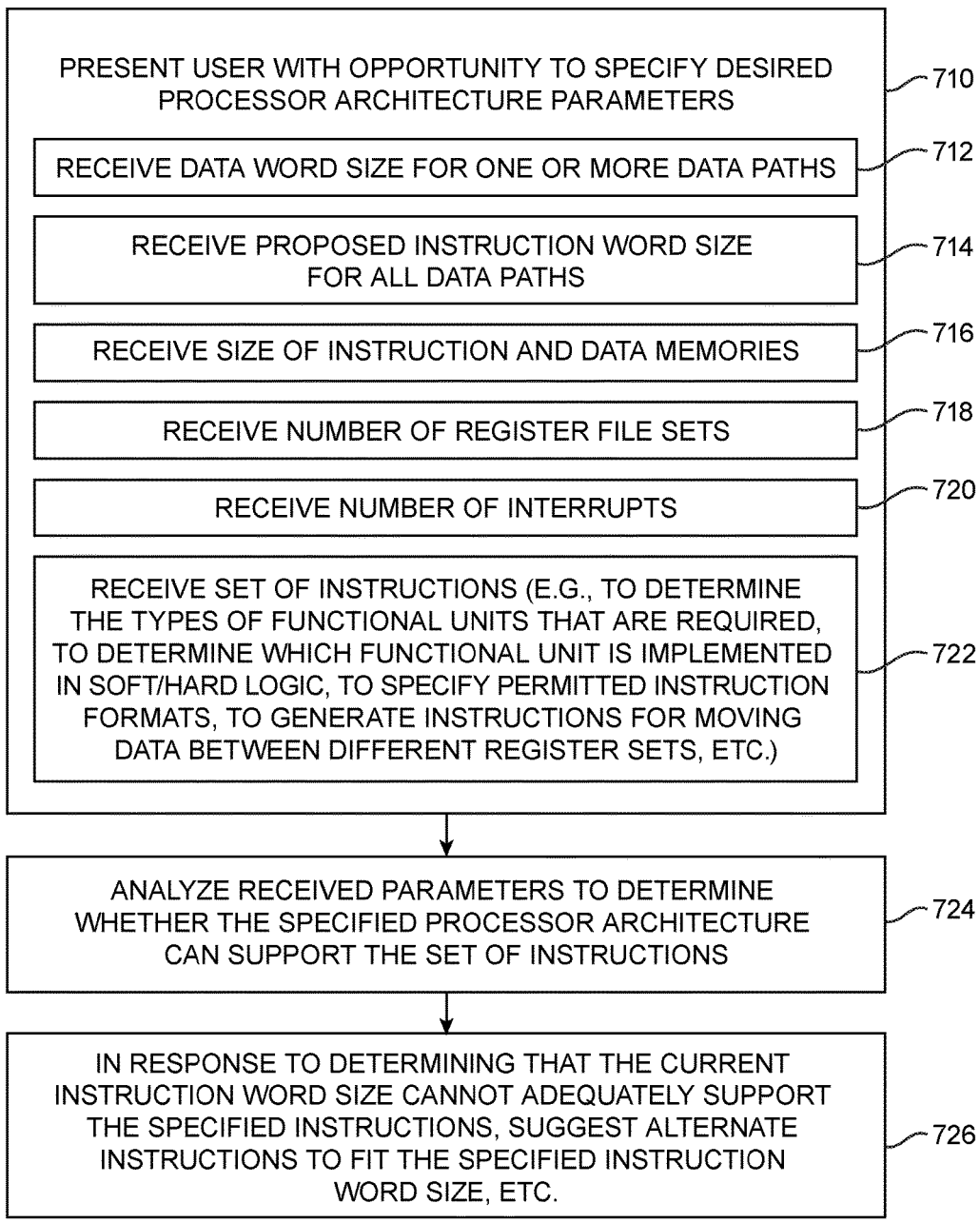
FIG. 10 is a flow chart of illustrative steps for using processor generator tools to specify and generate a base processor architecture for a programmable integrated circuit in accordance with an embodiment.

FIG. 10 is a flow chart of illustrative steps for using processor generator tools 702 to specify and generate a base processor architecture for programmable integrated circuit 100. At step 710, tools 702 may present the user with an opportunity to specify desired processor parameters. At step 712, tools 702 may receive from the user the data word size for one or more data paths. The processor is not limited to any word size, so the user can choose the appropriate data word size depending on the application, performance, and desired resource allocation. As an example, a main control loop of the processor may be assigned a 16-bit data word size, a floating point arithmetic module may be assigned a 32-bit data word size, an Advanced Encryption Standard (AES) module may be assigned a 128-bit word size, whereas an Elliptical Curve Cryptography (ECC) module may be assigned a 160-bit data word size. If desired, any number of data word sizes may be specified for the RISC processor architecture.

At step 714, tools 702 may receive a proposed instruction word size. The instruction word size is flexible, but only one instruction word size may be chosen for a particular processor architecture. As an example, the user may elect a relatively small instruction word size of 16 bits. As another example, the designer may elect to choose a relatively larger instruction word size of 40 bits. In general, the instruction word size can be any suitable number of bits.

At step 716, tools 702 may receive from the user the size of the instruction memory and data memory. As an example, the user may elect an instruction word size of 32 bits in step 714 and then decide that instruction memory 130b needs to store 10,000 instructions. In this scenario, instruction memory 130b should be specified to have a 320 k-bit capacity. As another example, the user may desire one million locations for storing 16-bit data for the main program, 10,000 locations for storing 32-bit floating point data, and 1000 locations for storing 128-bit encryption data. In this case, there may be three separate data paths each having their own dedicated data memory block with their respective requisite sizes.

At step 718, tools 702 may receive the desired number of registers. Multiple register sets may be specified (for different parallel data paths). As described in connection with FIG. 8, different register files sets may be defined for different applications. At step 720, tools 702 may also receive the allowable number of interrupts that can be handled by the processor.

At step 722, tools may receive from the designer a set of instructions that can be executed by the processor (e.g., to determine the types of functional units that are required in each data path, to determine which function unit is implemented in soft or hard logic, to specify the permitted instruction formats, to generate instructions for moving data between different register sets, etc.). For example, moving data from a smaller register set to a larger register set can be accomplished by specifying an instruction that moves the smaller register into a certain portion of the larger register. On the other hand, moving data from a larger register set to a smaller register set might be accomplished by moving a portion of the larger register into multiple different smaller destination registers.

Since the set of instructions will determine the type of functional units that are required, only those functions units whose operation is required by the specified instructions are included. If a functional unit is specified as a hard logic unit but the available hard logic structures do not support the operation completely, a library of mixed soft and hard functional components may be used to implement that particular function.

The user may also be able to define the permitted instruction formats. Some exemplary instruction formats include:

$$DestReg<=SrcRegA \ OPERATION \ SrcRegB \qquad (1)$$

$$DestReg<=SrcReg \qquad (2)$$

$$DestRegX<=DestRegX \ OPERATION \ SrcRegY \qquad (3)$$

$$<R2:R10><=<R2:R15>+<R2:R15> \qquad (4)$$

$$LOAD \ DestReg<=Value \qquad (5)$$

$$LDIMM<R2:R10><-<0-65536> \qquad (6)$$

$$Branch \ CONDITION \ destination \qquad (7)$$

Formats 1-3 represent register-to-register instruction formats. Format 2 (for example) may further specify whether data can only be moved from a smaller to a larger register or moved from a larger to a smaller register. If only format 3 was specified, tool 702 may be able to support a smaller instruction word size, thereby saving on instruction memory size (since only one source register is required). Format 4 specifies the range of allowable registers that can be accessed for the source and destination registers.

Formats 5 and 6 represent immediate type instructions, where an immediate value is directly loaded into a destination register. As an example, format 6 is a load-immediate instruction that allows a 16-bit data value to be loaded into one of nine different registers. Format 7 may represent a branch/control instruction format. Valid conditions might be if a particular register is equal to zero or equal to some other predetermined value, or there might be no conditions at all. Valid destinations might include an absolute address, a relative offset (forward or backward from the current location), or may be register indexed (by referring to a value stored in a particular register).

Formats 1-7 describe above are merely illustrative and are not intended to limit the scope of the present embodiments. If desired, any number and type of instruction formats may be specified during step 722.

At step 724, tool 702 may analyze the specified instruction word size and instruction formats to determine whether the specified processor architecture can support the set of instructions (e.g., to determine whether or not the instruction word size is too small to handle all the chosen instructions). In response to determining that the current instruction word size cannot adequately support the specified instructions, tool 702 may suggest alternative instructions to fit the specified instruction word size or to suggest a larger instruction word size (step 726). The user may then elect to accept the suggested modifications or to re-enter new processor specifications. This methodology ensures that a corresponding processor architecture generated by tool 702 can be supported by the underlying soft and embedded resources in programmable integrated circuit 100 (FIG. 1).

An important factor that affects the performance of a RISC processor in the amount of pipelining. Generally, the deeper the processor is pipelined, the higher the clock frequency, thus increasing performance. However, pipelining may result in greater penalty for a branch miss (due to the increased latency for instructions that need to be processed all over again), which will decrease performance. Choosing the optimal pipeline depth is therefore an important step in designing a processor.

Much of the processor's sensitivity to pipeline depth will be dependent on the application software. The user may or may not be aware of the software requirements at the time of specifying the processor. The optimal level of pipelining may therefore change during the design cycle of the processor. Fortunately, the use of re-programmable soft logic on device 100 can be leveraged to adjust the pipeline depth of the processor an unlimited number of times.

Figure 11:
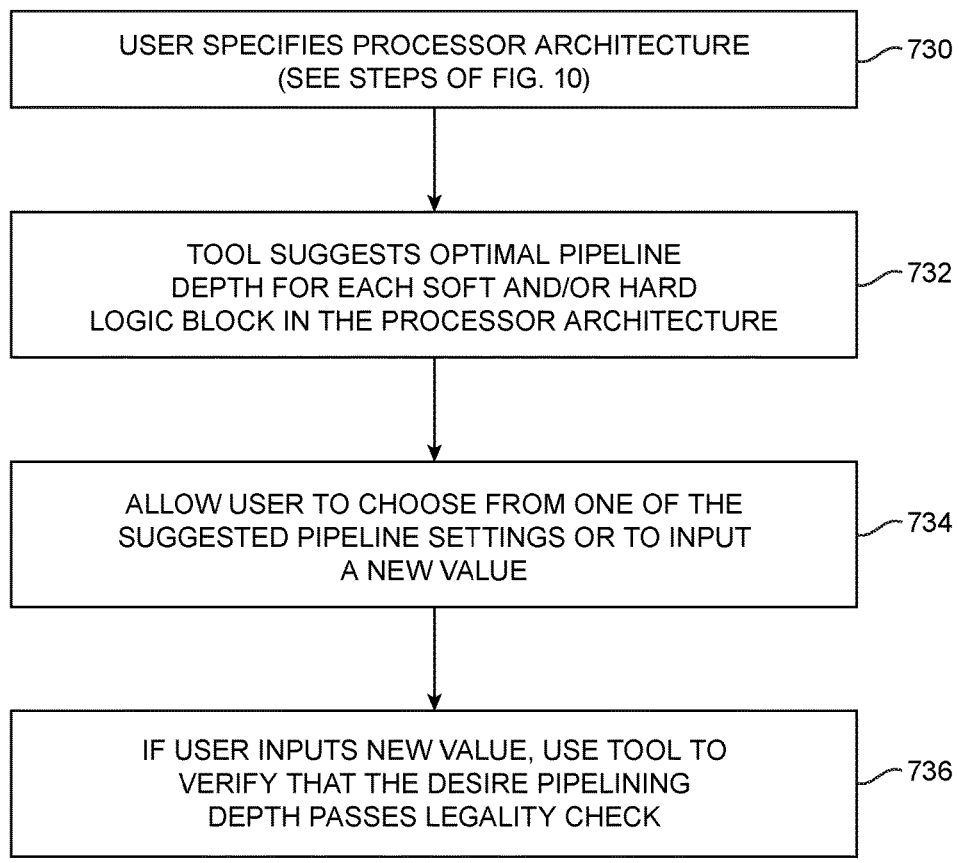
FIG. 11 is a flow chart of illustrative steps for using processor generator tools to select and verify desired pipelining depths for a processor architecture in accordance with an embodiment.

In accordance with another method that is not mutually exclusive with the first method shown in FIG. 10, processor generator tools 702 may be used to select and verify desired pipelining depths for a processor architecture (see, e.g., FIG. 11). At step 730, a base processor architecture (i.e., a representative model of the RISC processor) may be generated using tool 702 using the steps of FIG. 10.

Each embedded component in the model will have a range of latencies associated with it. For example, memory components may be configurable for no clocks (i.e., no registers are placed at the input or output ports of the memory), one clock (i.e., register at the input port only), or two clocks (i.e., a negative-edge-triggered registered at the input port and a positive-edge-triggered registered at the output port). As another example, each arithmetic logic unit may contain a DSP block, which may be configurable for zero to four register stages. As yet another example, the program sequencer may be configurable for up to three clocks. In general, soft logic that is used to combine the embedded hard blocks is not initially pipelined.

At step 732, tool 702 may suggest an optimal pipeline depth for each soft and/or hard logic block in the processor architecture. The soft logic will likely have the longest propagation path per equivalent unit function, so tool 702 may need to pipeline sections of soft logic for higher processor performance (more so than some of the hard blocks). In other words, the tool will make an estimate of the level of pipelining required for the soft logic and may adjust the pipeline depth of the embedded blocks so that they are not the bottleneck of the processor performance. The tool may also suggest pipelining the forwarding path (e.g., by inserting pipeline registers in paths 1307 in FIG. 8) to further boost performance.

The tool may also insert additional pipeline to meet some of the user-specified performance goals. This additional pipelining may be retimed through the soft logic, existing only to break up the long routing paths between soft logic and the embedded blocks, or even between embedded blocks. In some cases, it can even be used with a group of similar embedded blocks (e.g., if many embedded memories are used to construct one large instruction or data memory).

At step 734, the user may choose from one of the suggested pipeline settings or to autonomously input a new setting. In general, tool 702 may give provide the user with relevant information to help guide the user in making an appropriate selection of the pipeline depth of each block in the processor. If the user inputs a new value that is not one of the suggested pipelining schemes, tool 702 may verify that the newly inputted pipeline depth passes legality check (e.g., that the user-selected pipeline settings for the processor satisfies performance criteria). This methodology ensures that a corresponding processor architecture generated by tool 702 is able to meet the specified performance requirements.

While pipelining can help improve overall performance, insertion of pipeline registers throughout a processor can increase the likelihood of hazards such as structural hazards and/or data hazards in a processor. Structural hazards occur when there are not enough destination resources to handle concurrent operations (e.g., when two writes to the register file with a single write port arrive at the same clock cycle). A processor that is generated using tools 702 may exhibit more types of structural hazards than typical hard-wired application-specific microprocessors since many different types of functional units can be selected on programmable device 100. The different types of functional units in each data path may also have different pipeline delays.

In accordance with another method that is not mutually exclusive with the methods shown in FIGS. 10 and 11, processor generator tools 702 may be used to analyze the generated processor architecture for potential structural hazards and to provide different options to mitigate the structural hazards. At step 740, tool 702 may analyze all round trip paths from the source to the destination in a given data path. Tool 702 may then report a list of possible conflicts to the user.

At step 744, tool 704 may present the user with different options to resolve the potential detected structural hazards. The user may select option 746 to add additional ports to the associated register file. Option 748 may be selected to specify a priority resolution scheme that specifies which operations are given higher or lower priority. Option 750 may be selected to partition a destination register. For example, a first group of registers may be assigned to store floating point values, whereas a second group of registers may be assigned to store general purpose data and control signals. Option 752 may also be selected to temporarily stall the processor. Alternatively, no-ops and "bubbles" may be inserted.

Another option such as option 754 is to temporarily store values in a buffer or "shadow" register. This technique may be especially useful where the general purpose registers (GPRs) are much smaller than the special purpose registers (SPRs), so values in multiple general purpose registers can all be loaded into a buffer register before actually being written in to an SPR. This may create a more complex structural hazard to analyze, but if a data hazard does occur, it can be easily handle by stalling the processor (option 752).

Yet another option such as option 756 includes increasing the number of identical multicycle operations. Multicycle operations can generate structural hazards if more than one instruction is issued during its initiation interval (i.e., during a period in which a set of new inputs can be applied to a given function). If multiple multicycle operators of the same type are selected, no pipeline stall will occur unless they are all processing at the same time. The multi-cycle operators of the same type may have operations initiated in a round-robin fashion or some other method of efficiently processing these operations may be employed.

Figure 12:
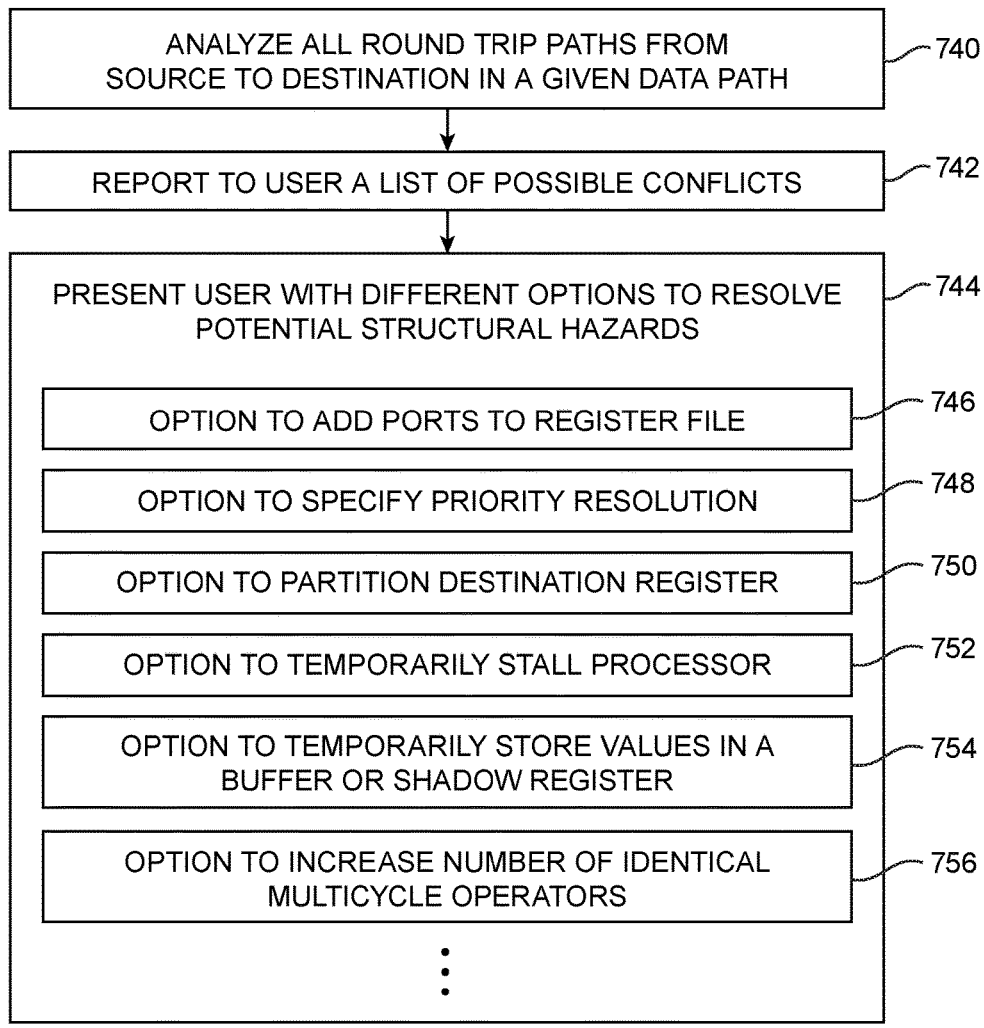
FIG. 12 is a flow chart of illustrative steps for using processor generator tools to analyze for potential structural hazards and to provide different options to mitigate the structural hazards in accordance with an embodiment.

Options 744 shown in FIG. 12 represent merely exemplary techniques for resolving structural hazards and are not intended to limit the scope of the present embodiments. Tool 702 may automatically elect one or more of these options or the user may autonomously select from among these options to mitigate potential structural hazards.

In accordance with yet another method that is not mutually exclusive with the methods shown in FIGS. 10-12, processor generator tools 702 may be used to analyze the generated processor for potential data hazards and to provide different options to mitigate the data hazards. In contrast to structural hazards, data hazards occur when a stored value is different than expected, mostly due to the pipelined nature of the processor. For example, a read after write (RAW) hazard occurs when a register is read (as a source) before the next value due to be written into that register has been written back. As another example, a write after write (WAW) hazard can occur when two instructions write to the same location, but the first instruction's pipeline is much longer than the second instruction's pipeline, and the first instruction's write-back value is the value that remains in the storage location after both instructions have been completed.

At step 760, tool 702 may allow the user to specify a pipeline depth for each data path (e.g., using the steps of FIG. 11). At step 762, tool 702 may analyze each data path and provide a list of possible conflicts.

At step 764, tool 702 may present the user with different options to resolve the potential data hazards detected at step 762. The user may select option 766 to manage all data hazards via software. This places the burden on the software engineer to ensure that data hazards do not occur or are properly handled. Another option such as option 768 includes implementing hardware interlocking to stall the top of the processor pipeline. Stalling will persist until the bottom of the pipeline is cleared.

Yet another option such as option 770 may allow the user to choose all forwarding levels suggested by tool 702. Different data paths can have a different number of user-selected forwarding levels. For example, if there are separate processing pipes (e.g., one for general purpose processing, another for floating point processing, and another for encryption—each with their own register set), the user can specify forwarding for one or more, but not all the pipes to reduce complexity. As the multiplexing circuitry that is required for forwarding can require significant amounts of soft logic and routing, optimization of the forwarding logic can save resources while improving the processor operating frequency.

Figure 13:
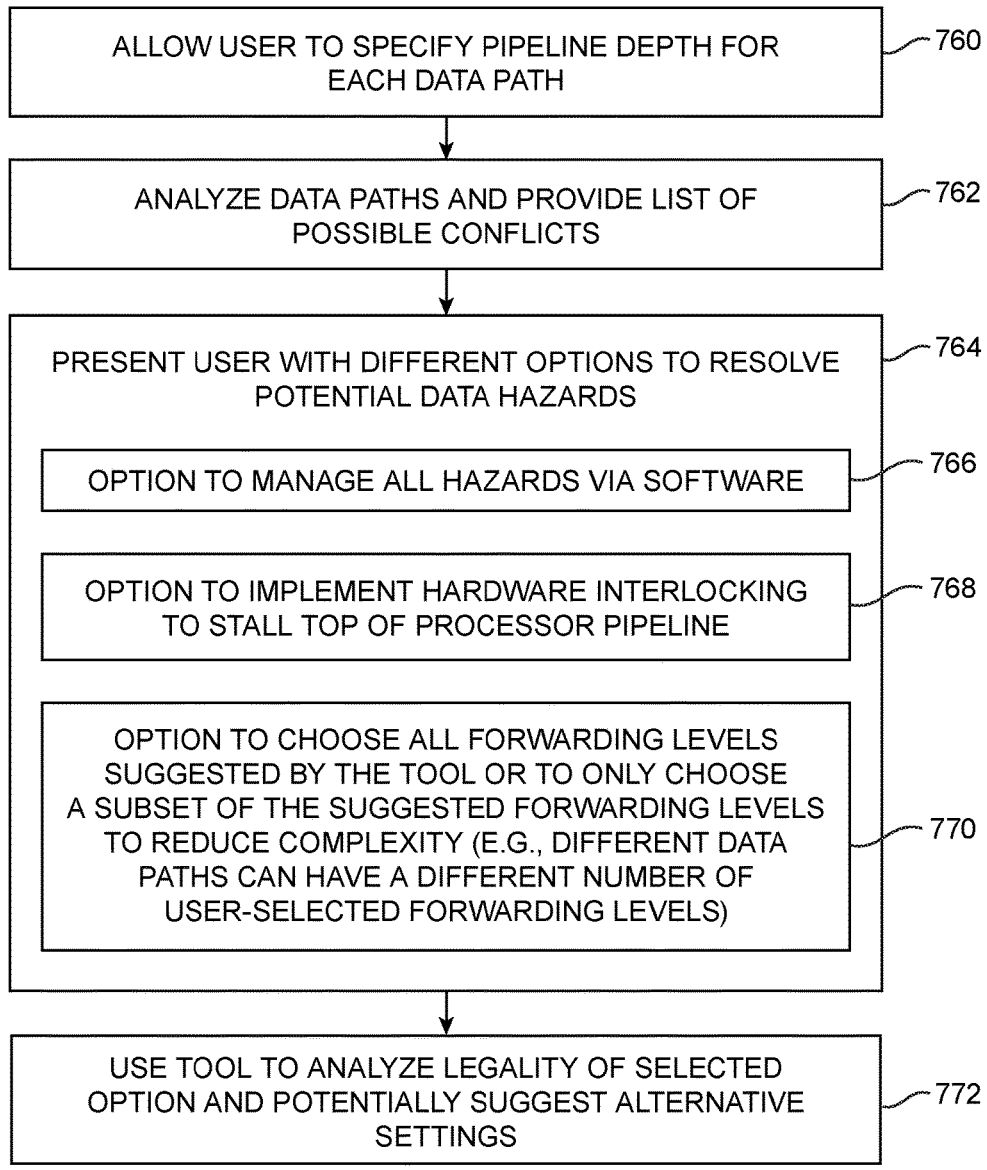
FIG. 13 is a flow chart of illustrative steps for using processor generator tools to analyze for potential data hazards and to provide different options to mitigate the data hazards in accordance with an embodiment.

Options 764 shown in FIG. 13 represent merely exemplary techniques for resolving data hazards and are not intended to limit the scope of the present embodiments. Tool 702 may automatically elect one or more of these options or the user may autonomously select from among these options to mitigate the data hazards. Depending on the user input, tool 702 may then analyze the legality of the selected option(s) and potentially suggest alternative settings. The methodologies of FIGS. 12 and 13 ensure that a corresponding processor architecture generated by tool 702 will be free from structural and data hazards.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/INTEL Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

What is claimed is:

1. A method of using processor generator tools implemented on computing equipment to generate a processor on a programmable integrated circuit having embedded circuitry and programmable circuitry, the method comprising:
with the computing equipment, receiving processor parameters;
with the computing equipment, analyzing the received processor parameters to determine whether a processor specified by the received processor parameters can be generated from the embedded circuitry and the programmable circuitry in the programmable integrated circuit; and
in response to determining that the processor specified by the received processor parameters can be generated, generating the processor on the programmable integrated circuit at least in part by configuring the programmable circuitry in the programmable integrated circuit to selectively update a connection between first and second portions of the embedded circuitry in the programmable integrated circuit.

2. The method of claim 1, further comprising:
in response to determining that the processor specified by the received processor parameters cannot be generated, providing alternative processor parameters.

3. The method of claim 1, wherein generating the processor on the programmable integrated circuit comprises generating a reduced instruction set computing (RISC) processor on the programmable integrated circuit.

4. The method of claim 1, wherein receiving the processor parameters comprises receiving a data word size for a given data path in the processor.

5. The method of claim 1, wherein receiving the processor parameters comprises receiving different data word sizes for multiple data paths in the processor.

6. The method of claim 1, wherein receiving the processor parameters comprises receiving an instruction word size for the processor.

7. The method of claim 1, wherein receiving the processor parameters comprises receiving a number of registers for the processor.

8. The method of claim 1, wherein receiving the processor parameters comprises receiving a number of interrupts that is supported by the processor.

9. The method of claim 1, wherein receiving the processor parameters comprises receiving a set of instructions for the processor.

10. The method of claim 9, further comprising:
in response to receiving the set of instructions, with the processor generator tools, determining one or more functional units that are required to generate the processor.

11. The method of claim 10, further comprising:
in response to receiving the set of instructions, with the processor generator tools, determining a first portion of the one or more functional units that are implemented using programmable circuitry on the programmable integrated circuit; and
in response to receiving the set of instructions, with the processor generator tools, determining a second portion of the one or more functional units that are implemented using embedded circuitry on the programmable integrated circuit.

12. A method for using processor generator tools implemented on computing equipment to generate a processor on a programmable integrated circuit that includes programmable resources, the method comprising:
with the computing equipment, generating the processor on the programmable integrated circuit from a plurality of processor components that are coupled to the programmable resources, wherein generating the processor comprises configuring the programmable resources to which the plurality of processor components are coupled;
with the computing equipment, providing suggested pipeline settings for each of the processor components in the processor; and
with the computing equipment, inserting additional pipeline stages into the processor based on the suggested pipeline settings, wherein inserting the additional pipeline stages comprises configuring the programmable resources on the programmable integrated circuit.

13. The method of claim 12, further comprising:
with the computing equipment, presenting a user of the processor generator tools with an opportunity to choose one or more pipeline settings from among the suggested pipeline settings.

14. The method of claim 13, further comprising:
with the computing equipment, verifying that the one or more pipeline settings chosen by the user pass legality check.

15. The method of claim 12, further comprising:
with the computing equipment, implementing the plurality of processor components using soft logic and hard logic on the programmable integrated circuit;
with the computing equipment, inserting a first number of pipeline stages in a first component in the plurality of processor components that has been implemented in the soft logic; and
with the computing equipment, inserting a second number of pipeline stages in a second component in the plurality of processor components that has been implemented in the hard logic, wherein the first number is greater than the second number.

16. A method for using processor generator tools implemented on computing equipment to generate a processor on a programmable integrated circuit, the method comprising:
generating the processor with a plurality of data paths based at least in part on circuitry embedded on the programmable integrated circuit, wherein each data path in the plurality of data paths has a corresponding functional unit;
analyzing the plurality of data paths to determine whether a hazard associated with a difference in the corresponding functional units for the plurality of data paths is present;
in response to determining that the processor exhibits the hazard associated with the difference in the corresponding functional units, providing an option to resolve the hazard; and
modifying the processor, wherein the modified processor is free from the hazard.

17. The method of claim 16, wherein analyzing the plurality of data paths comprises analyzing each of the plurality of data paths to determine whether a structural hazard is present in the processor.

18. The method of claim 17, wherein providing the option comprises providing an option selected from the group consisting of:
an option to add ports to a register file in the processor;
an option to specify a priority resolution scheme for conflicting operations;
an option to partition a destination register in the processor;
an option to temporarily stall the processor;
an option to temporarily store values in a shadow register; and
an option to increase the number of identical multicycle operations in the processor.

19. The method of claim 16, wherein analyzing the plurality of data paths comprises analyzing each of the plurality of data paths to determine whether a data hazard is present in the processor.

20. The method of claim 19, wherein providing the option comprises providing an option selected from the group consisting of:
an option to manage the data hazard in software;
an option to implement hardware interlocking to stall the top of a processor pipeline; and
an option to specify a level of forwarding for each data path in the plurality of data paths.

* * * * *